United States Patent [19]

Kim et al.

[11] Patent Number: 5,530,812
[45] Date of Patent: Jun. 25, 1996

[54] BUS INTERFACE CIRCUIT

[75] Inventors: You S. Kim, Seoul; Sang R. Lee, Kyeongki-do, both of Rep. of Korea

[73] Assignee: Hyundai Electronics Ind. Co., Ltd., Kyeongki-do, Rep. of Korea

[21] Appl. No.: 246,057

[22] Filed: May 19, 1994

[30] Foreign Application Priority Data

May 20, 1993 [KR] Rep. of Korea ............... 1993 8670

[51] Int. Cl.$^6$ ............................................... H01J 13/00
[52] U.S. Cl. ............................................... 395/309
[58] Field of Search .................................. 395/325, 550, 395/306, 308, 309, 285; 326/46, 12; 307/409

[56] References Cited

U.S. PATENT DOCUMENTS

| | | | |
|---|---|---|---|
| 5,016,219 | 5/1991 | Nolan et al. | 365/195 |
| 5,060,239 | 10/1991 | Briscoe et al. | 375/38 |
| 5,388,250 | 2/1995 | Lewis et al. | 395/550 |

Primary Examiner—Jack B. Harvey
Assistant Examiner—Xuong M. Chung-Trans
Attorney, Agent, or Firm—Wenderoth, Lind & Ponack

[57] ABSTRACT

A bus interface circuit is for coupling between a microprocessor having an architecture in which address and data buses are separated and peripheral equipment having a multiplexing bus architecture. The bus interface circuit includes a first delay circuit for delaying a first address strobe signal of a microprocessor to obtain a first data strobe signal, a second delay circuit for delaying the first data strobe signal to obtain a second data strobe signal for the peripheral equipment, a logic circuit for multiplying an inverted first data strobe signal and the first address strobe signal to obtain a second address strobe signal for the peripheral equipment, a first buffer enabled by the first data strobe signal for transmitting address data of the microprocessor, and second buffer means enabled by the second address strobe signal for transmitting and receiving data information between the microprocessor and the peripheral equipment.

9 Claims, 3 Drawing Sheets

BUS INTERFACE CIRCUIT

FIELD OF THE INVENTION

This invention relates a bus interface circuit for computer and communications systems, and in particular to a bus interface circuit for coupling a microprocessor having a separate address and data bus architecture and a peripheral device having a multiplexing bus architecture.

BACKGROUND OF THE INVENTION

Microprocessors execute system control and data processing for computers and/or ISDN systems. Two categories of microprocessors exist, one having a multiplexing bus architecture and the other having a separated bus architecture which are manufactured by Intel and Motorola, respectively.

The conventional microprocessor having the separated bus architecture operates at a timing relation as shown in accompanying FIG. 1, where A designates a system clock signal; B is an address strobe signal; C is a address bus signal; and D is a data bus signal. As shown in FIG. 1, the address and data buses operate to output the address signal from the microprocessor or to output and input the data for one single command language to process the data during one operating cycle. In order to couple such conventional microprocessors having a separated bus architecture to peripheral equipment having a multiplexing bus architecture, a third configuration must be interposed therebetween due to the different bus architectures.

SUMMARY OF THE INVENTION

In order to overcome the above defined disadvantage, the object of the invention is to provide a system for permitting coupling between microprocessors and peripheral equipment having different bus architectures, where a precise interface timing is provided to achieve the coupling capability, dispensing with any third intermediary rectification circuitry and irrespective of differences in the operating cycle frequencies in the microprocessors.

To this end, a bus interface system is provided according to the invention which comprises first delay means for delaying a first address strobe signal of a microprocessor to obtain a first data strobe signal, second delay means for delaying the first data strobe signal, second delay means for delaying the data strobe signal to obtain a second data strobe signal for peripheral equipment, logic means for multiplying an inverted first data strobe signal and the first address strobe signal to obtain a second address strobe signal for the peripheral equipment, first buffering means enabled by the first data strobe signal for transmitting address data of the microprocessor, and second buffering means enabled by the second address strobe signal for transmitting and receiving data information between the microprocessor and the peripheral equipment.

Figure 1:
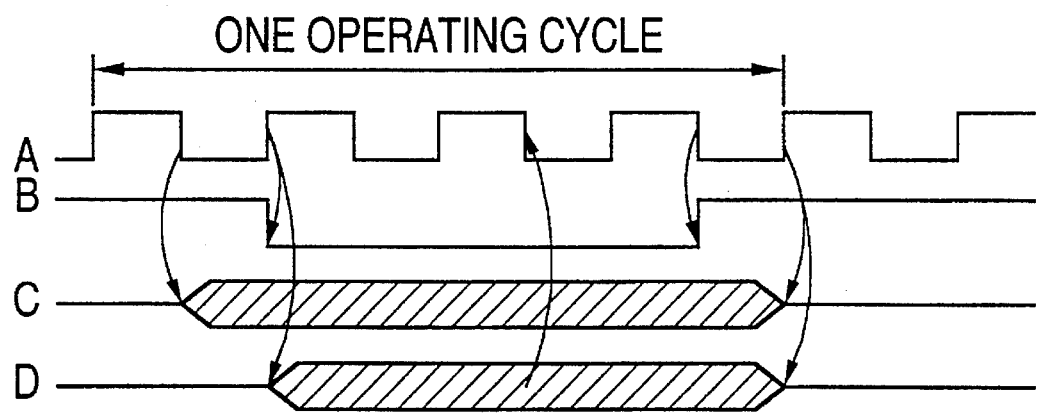
FIG. 1 shows an operative timing chart of a conventional microprocessor having a separated bus architecture.

Reference numeral 10 designates first delay means; 20 denotes second delay means; 30 denotes logic means; 40 denotes first buffering means; 50 denotes second buffering means; 60, 70 and 80 denote invertors; and 11 and 21 denote D-flipflops.

DETAILED DESCRIPTION OF THE PREFERRED EMBODIMENTS

Figure 2:
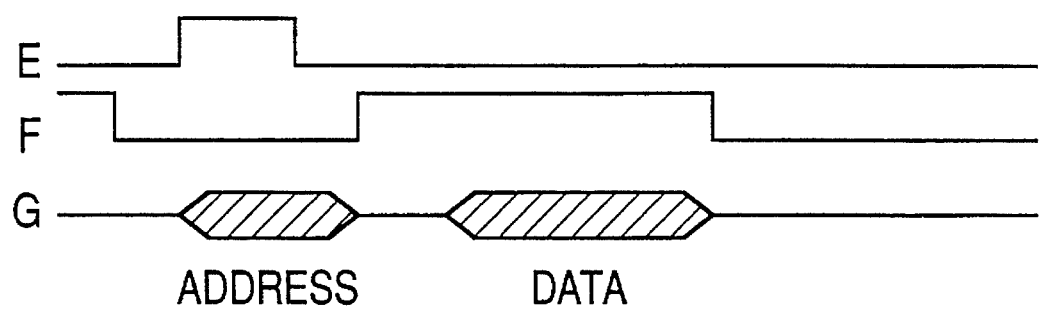
FIG. 2 shows a bus timing of peripheral equipment relating to the invention.

A bus timing strobe of peripheral equipment is shown in FIG. 2. In this figure, E is an address strobe signal; F is a data strobe signal; and G is and address/data bus signal. FIG. 2 relates to the case that the peripheral equipment has a multiplexing bus architecture where the address data is loaded on the address/data bus at the address strobe signal E. Sequentially, the data information is loaded on the address/data bus at the data strobe signal F.

Figure 3:
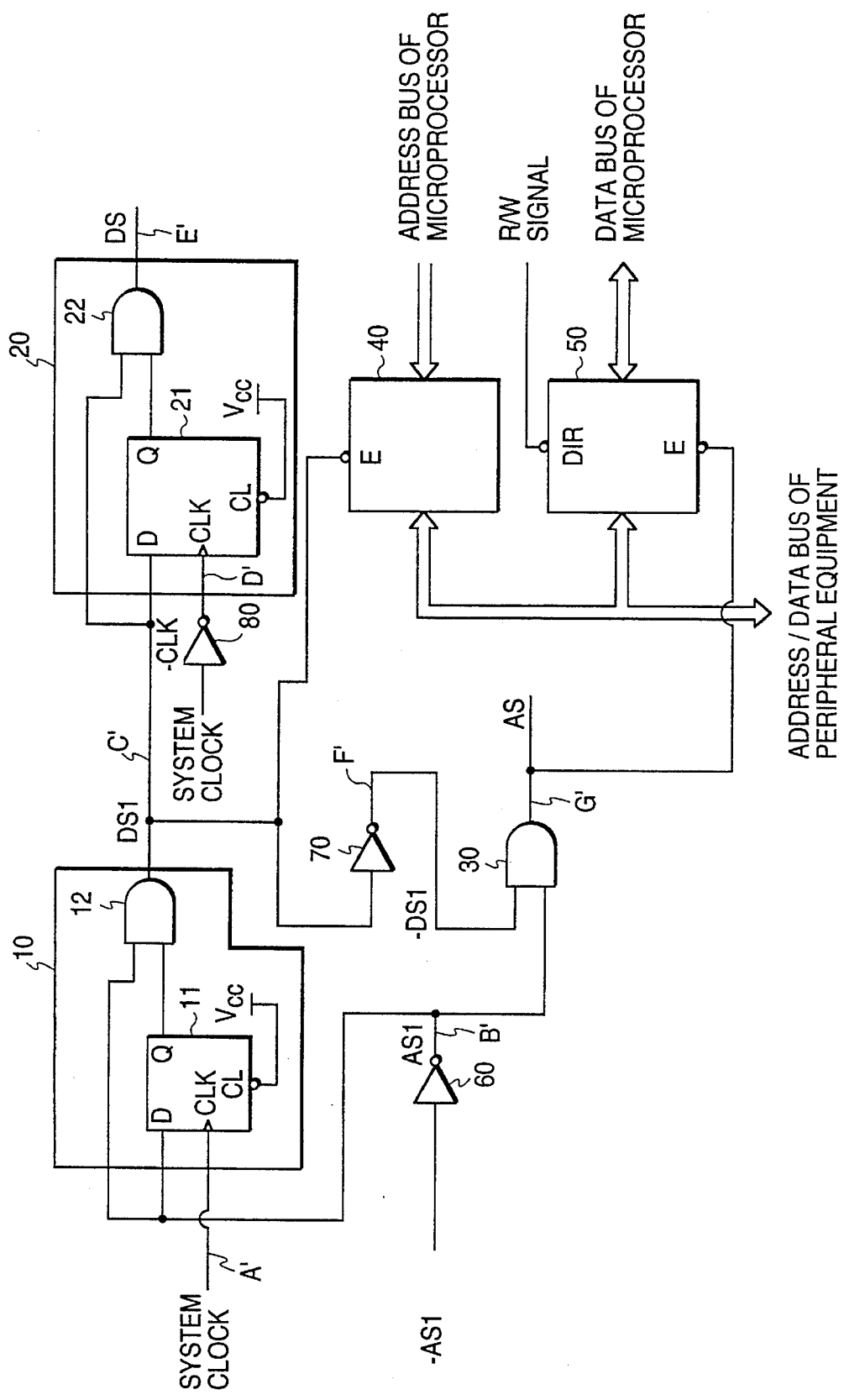
FIG. 3 show a circuit diagram of a bus interface.

A bus interface embodied by the invention as shown in FIG. 3 comprises a first and second delay means 10 and 20 comprised of D-flipflops 11 and 21 and logic multipliers 12 and 22, respectively. A first invertor 60 is connected to the input terminal of the first delay means 10. Logic means 30 has one input terminal connected to the first invertor 60. A second invertor 70 is connected to the other, input terminal of the logic means 30. A third invertor 80 is connected to the second delay means 20. A first and second buffering means 40 and 50 are unidirectional and bidirectional, respectively.

Figure 4A:
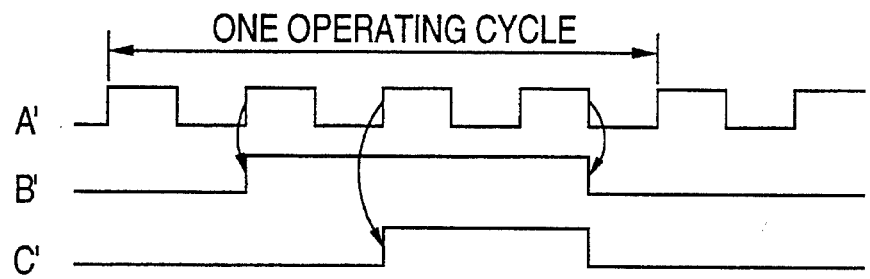
FIGS. 4(a)–(b) show operative timing charts of the bus interface of FIG. 3.
Figure 4B:
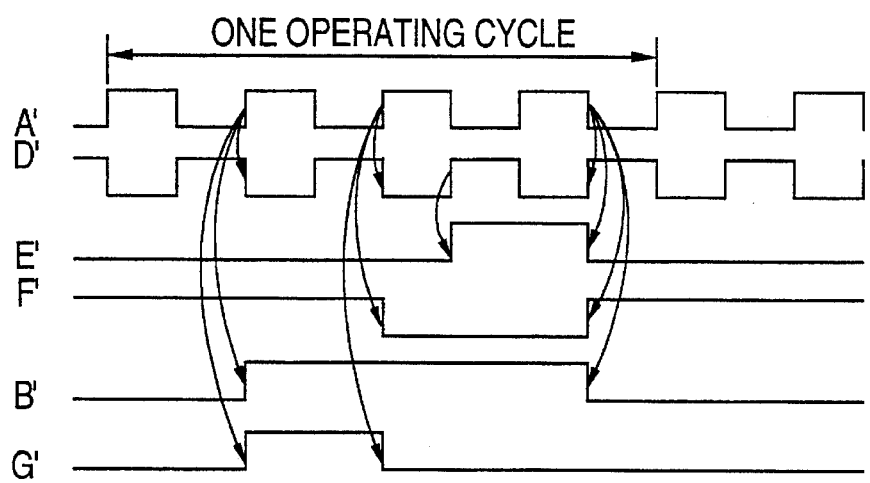

In FIGS. 4(a)–(b) showing the operative timing chart of the embodiment of the invention, A' is a system clock signal; B' is a signal from the first invertor; C' is a signal from the first delay means; D' is an inverted signal of the system clock signal; E' is a signal from the second delay means; F' is a signal from the second invertor; G' is a signal from the logic means 30; H' is an effective address signal; and I' is an effective data signal.

FIG. 4(a) shows a chart of a timing at which the data strobe signal DS1 (which is signal C') is produced by action of an address strobe signal AS1 (which is signal B') during one operating cycle of the system clock A'.

FIG. 4(b) shows a similar chart of a timing at which an address strobe signal AS (which is signal G') and a data strobe signal DS (which is signal E') are produced by action of the address strobe signal AS1 (which is signal B') and the data strobe signal DS1 (which is signal C') during one operating cycle of the system clock A'.

Figure 4C:
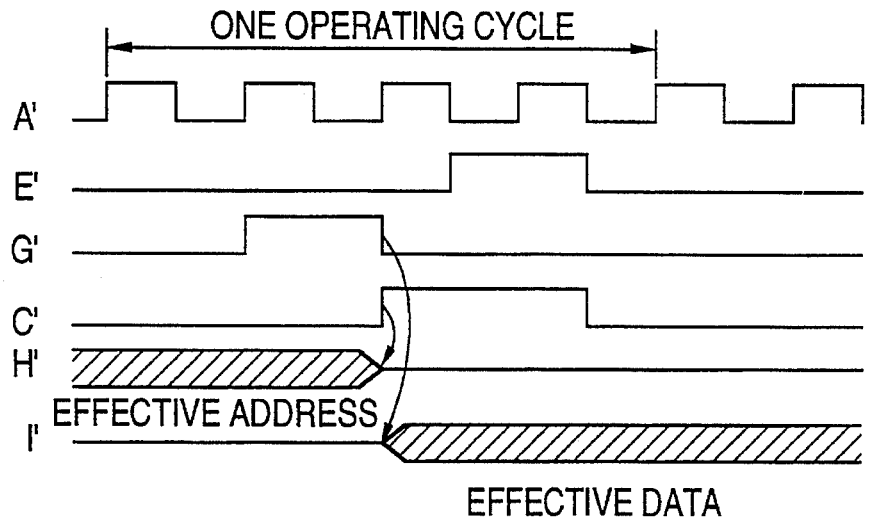

FIG. 4(c) shows a similar chart of a timing at which the address and the data buses are operated by action of the address strobe signal AS (which is signal G') and the data strobe signal DS (which is signal E').

The operation of the circuit of FIG. 3 will now be described. The address strobe signal –AS1 applied from a microprocessor (not shown) is phase-inverted by the first invertor 60 into the inverted address strobe signal AS1 which is signal B' shown in FIGS. 4(a)–(b). The inverted address strobe signal is applied to the input terminal of the D-flipflop 11 and the one input terminal of the logic multiplier 12. The output terminal of the D-flipflop 11 is connected to the other terminal of the logic multiplier 12. Thus, the multiplier multiplies the inverted address strobe signal AS1 and the D-flipflop output. The first delay means 10 delays the inverted address strobe signal for a determined length of time, whereby the logic multiplier 12 thereof produces the data strobe signal DS1 which is signal C' in FIGS. 4(a) and (c), which enables the first buffering means 40.

In the second delay means 20, the D-flipflop 21 is applied at the input terminal D with an output DS1 of the first delay means 10, and the logic multiplier 22 multiplies outputs of the first delay means 10 and the D-flipflop 21. Also applied to the D-flipflop is an inverted clock -CLK which is signal D' in FIG. 4(b) and which is output by invertor 80. Thus, the second delay means 20 generates the data strobe signal DS which is signal E' in FIGS. 4(b) and (c) for a determined operating cycle and outputs the same for the peripheral equipment.

The logic multiplier 30 multiplies an inverted output signal −DS1 which is signal F' in FIG. 4(a) from an invertor 70 and the inverted address strobe signal AS1 to produce an address strobe signal AS which is signal G' in FIGS. 4(b) and (c) and which acts as an enable signal for the second buffering means 50 and as an address strobe signal for the peripheral equipment.

The first buffering means 40 are enabled by the data strobe signal DS1 which is signal C' in FIGS. 4(a) and (c) to buffer an effective address shown at H' in FIG. 4(c). The second buffering means 50 are enabled by the address strobe signal AS which is signal G' in FIGS. 4(b) and (c) to buffer an effective data shown at I' in FIG. 4(c).

The timing relationship as shown in FIGS. 4(a)–(b) is an ideal mode with minimum gating delay of the individual components in the interface circuit. Practically, each component has a gating delay time. With regard to the gating delay time, regular operation can be assured with a clock frequency equal to or lower than 20 MHz When the clock frequency is higher, the related components having any substantial gating delay time have to be specially selected.

The timing relationship shown in FIGS. 4(a)–(b) relates to the case in which the data and address strobe signals DS and AS are both active on a high level. When they are active on a low level, the data and the address strobe signals can be inverted for application.

From the foregoing explanation of the embodiment, it is clear than an interface timing can be precisely achieved between a microprocessor and peripheral equipment having different bus architectures by delaying an address strobe signal for a determined period of time for transmission of the address data, and multiplying the address strobe signal and the delayed signal for data exchange.

In the invention, a system clock is derived for generation of various operative signals, independently from the kind and operating speed of the microprocessors having a separated bus architecture, thus achieving a precise interface timing applicable to coupling to all peripheral equipment having a multiplexing bus architecture, without an intermediary modification.

What is claimed is:

1. A bus interface circuit for coupling a combined address/data bus of a peripheral device with separate address and data buses of a microprocessor, said bus interface circuit comprising:

a first delay circuit which delays a first address strobe signal obtained from the microprocessor to output a first delayed data strobe signal;

a second delay circuit, operatively coupled to said first delay circuit, which delays the first delayed data strobe signal to output a second delayed data strobe signal, the second delayed data strobe signal being applied to the peripheral device as a data strobe signal;

a multiplier, operatively coupled to said first delay circuit, which multiplies an inverted first delayed data strobe signal and the first address strobe signal to output a second address strobe signal, the second address strobe signal being applied to the peripheral device as an address strobe signal;

a first buffer, operatively coupled to said first delay circuit, which is enabled by the first delayed data strobe signal to transmit address data from the address bus of the microprocessor to the combined address/data bus of the peripheral device; and a second buffer, operatively coupled to said multiplier, which is enabled by the second address strobe signal to transmit information data between the data bus of the microprocessor and the combined address/data bus of the peripheral device.

2. A bus interface circuit as claimed in claim 1, wherein said first delay circuit includes a D-flipflop having the first address strobe signal input thereto, and a logic multiplier which multiplies an output of the D-flipflop and the first address strobe signal to obtain the first delayed data strobe signal.

3. A bus interface circuit as claimed in claim 2, wherein said second delay circuit includes a second D-flipflop having the first delayed data strobe signal input thereto, and a second logic multiplier which multiplies an output of the second D-flipflop and the first delayed data strobe signal to obtain the second delayed data strobe signal.

4. A bus interface circuit as claimed in claim 1, wherein said second delay circuit includes a D-flipflop having the first delayed data strobe signal input thereto, and a logic multiplier which multiplies an output of the D-flipflop and the first delayed data strobe signal to obtain the second delayed data strobe signal.

5. A bus interface circuit as claimed in claim 1, wherein an output of said first delay circuit is coupled to an enable input of said first buffer.

6. A bus interface circuit as claimed in claim 5, wherein an output of said multiplier is coupled to an enable input of said second buffer.

7. A bus interface circuit as claimed in claim 6, wherein said first buffer is unidirectional and said second buffer is bidirectional.

8. A bus interface circuit as claimed in claim 1, wherein an output of said multiplier is coupled to an enable input of said second buffer.

9. A bus interface circuit as claimed in claim 1, wherein said first buffer is unidirectional and said second buffer is bidirectional.

* * * * *